United States Patent Office 3,662,006
Patented May 9, 1972

3,662,006
HYDROXYLATION OF AROMATIC COMPOUNDS
Stephen N. Massie, Palatine, and Robert E. Daum, Cary, Ill., assignors to Universal Oil Products Company, Des Plaines, Ill.
No Drawing. Filed May 12, 1969, Ser. No. 823,984
Int. Cl. C07c 43/22, 37/00
U.S. Cl. 260—613 D                    10 Claims

ABSTRACT OF THE DISCLOSURE

The nuclear hydroxylation of aromatic compounds is effected by treating an aromatic compound with hydrogen peroxide in the presence of a catalyst comprising metal in the valent state of zero at hydroxylation conditions.

---

This invention relates to a process for the nuclear hydroxylation of aromatic compounds. More particularly the invention is concerned with a process whereby one or more hydroxyl groups are introduced into the nucleus of an aromatic compound.

Hydroxylated aromatic compounds will find a wide variety of uses in the chemical field. For example, hydroquinone is an important chemical which is utilized for photographic developers, in dye intermediates, in medicine, as an antioxidant for fats and oils, as an inhibitor, in coating compounds, in paints and varnishes, as well as in motor fuels and oils. In addition, it is also used as an intermediate for preparing mono- and dibenzyl ethers of hydroquinone, the latter compounds being used as stabilizers, antioxidants, solvents, as well as being used in perfumes, plastics and pharmaceuticals. Likewise, the dihydroxylated benzene compound, catechol, may be used as an antiseptic, in photography, dye-stuffs, as an antioxidant or light stabilizer. Furthermore, catechol is used as an intermediate for the preparation of the dimethyl ether of catechol which is used as an antioxidant and for the preparation of the mono-methyl ether of catechol which is guaiacol, said guaiacol being an important component of many medicinal preparations.

Likewise, phenol and the cresols are used in phenolic resins, as disinfectants, flotation agents, surfactants, scouring compounds, lube oil additives, photographic developers, intermediates in ink, paint, and varnish removers, etc. In addition, hydroxy-substituted aromatic carbohydrate derivatives may be used as intermediates in detergents, water-soluble pharmaceuticals, explosives, gelling agents, surface coatings, resins and oxidative inhibitors.

It is therefore an object of this invention to provide a process for preparing hydroxylated aromatic compounds.

A further object of this invention is to provide a process for introducing hydrogen substituents into the nucleus of an aromatic compound utilizing certain catalytic compositions of matter to effect the hydroxylation.

In one aspect an embodiment of this invention is found in a process for the nuclear hydroxylation of a aromatic compound which comprises treating said aromatic compound with hydrogen peroxide at hydroxylation conditions in the presence of a catalyst comprising a metal in the valence state of zero, and recovering the resultant hydroxylated aromatic compound.

A specific embodiment of this invention resides in a process for the nuclear hydroxylation of phenol which comprises treating phenol with hydrogen peroxide at a temperature in the range of from about −10° to about 100° C. and at a pressure in the range of from about atmospheric to about 50 atmospheres in the presence of a catalyst comprising iron in the valence state of zero, and recovering the resultant mixture of catechol and hydroquinone.

Other objects and embodiments of this invention will be found in the following further detailed description thereof.

As hereinbefore set forth, the present invention is concerned with the process for introducing hydroxyl substituents into the nuclear ring of an aromatic compound, said hydroxylation being effected by treating an aromatic compound with hydrogen peroxide in the presence of certain catalytic compositions of matter hereinbefore set forth in greater detail. The starting materials which may be utilized in the process of this invention comprise aromatic hydrocarbons as well as derivatives thereof. For purposes of this invention the term "aromatic compound" is used in the present specification and appended claims will refer to these hydrocarbons and derivatives thereof and will include primary, secondary, and tertiary substituted alkyl aromatic hydrocarbons such as toluene, o-xylene, m-xylene, p-xylene, ethylbenzene, n-propylbenzene, n-butylbenzene, n-pentylbenzene, cumene (isopropylbenzene), sec-butylbenzene, tert-butylbenzene, tert-pentylbenzene, etc., cyclopentylbenzene, cyclohexylbenzene, 1-methylnaphthalene, 2-methylnaphthalene, 1-ethylnaphthalene, 2 - ethylnaphthalene, 1 - isopropylnaphthalene, 2-isopropylnaphthalene, 1-tert-butylnaphthalene, 2-tert-2-isopropylnaphthalene, 1,2-dimethylnaphthalene, 1,2-diethylnaphthalene, methylbiphenyl, ethylbiphenyl, ethylbiphenyl, etc.; hydroxy-substituted aromatic compounds such as phenol, hydroquinone, catechol, resorcinol, 1-hydroxynaphthalene, 2-hydroxynaphthalene, 1,2-dihydroxynaphthalene, etc.; alkoxy-substituted aromatic compounds such as anisole, phenetol, n-propoxybenzene, o-methylanisole, m-methylanisole, p-methylanisole, m-ethylanisole, p-ethylanisole, o-methylphenetol, m-methylphenetol, p-methylphenetol, etc.; halo-alkyl aromatic compounds such as o-chlorotoluene, m-chlorotoluene, p-chlorotoluene, o-bromotoluene, m-bromotoluene, p-bromotoluene, o-chloroethylbenzene, m-chloroethylbenzene, p-chloroethylenzene, o-bromoethylbenzene, m-bromoethylbenzene, p-bromoethylbenzene, 2-chloro-1-methylnapthalene, 2-bromo-1-methylnaphthalene, 4-chloro-1-methylnaphthalene, 4-bromo-1-methylnaphthalene, 2-chloro - 1 - ethylnaphthalene, 4-bromo-1-ethylnaphthalene, etc.; aromatic carbohydrate derivatives of aromatic compounds such as 1,1-diphenyl-1-desoxy-D-glucitol, 1,1-ditolyl-1-desoxy-D-glucitol, 1,1-bis-(p-isopropylphenyl)-1-desoxy-D-glucitol, 1,1 - bis-(p-methoxyphenyl)-1-desoxy-D-glucitol, 1,1-bis-(p-hydroxyphenyl)-1-desoxy-D-glucitol, the corresponding aromatic derivatives of other hexoses (fructose, sorbose, tagatose, psicose, idose, gulose, talose), glycolaldehyde, trioses, tetraoses, pentoses, etc. It is to be understood that the aforementioned compounds are only representative of the type of aromatic hydrocarbons and derivatives thereof which may be utilized as starting materials in the hydroxylation process of the present invention and that said invention is not necessarily limited thereto. Utilizable aromatic derivatives may be represented by the following generic formula: $R_mArX_n$ in which Ar is a monocyclic or polycyclic aromatic hydrocarbon nucleus, R is independently selected from the group consisting of n-alkyl, sec-alkyl, tert-alkyl, cycloalkyl, hydroxyl, alkoxyl and hydroxyalkyl radicals, X is independently selected from the group consisting of hydrogen, halogen and nitro substituents, and $m$ and $n$ are integers of at least one.

It is also contemplated within the scope of this invention that heterocyclic compounds such as quinoline may also be treated with hydrogen peroxide in the presence of the catalysts hereinafter described according to the process of this invention. While the aforementioned list of compounds discloses the presence of primary, secondary, and tertiary alkylated aromatic hydrocarbons as well as hydroxy and alkoxy substituted aromatic compounds, it has been found that unalkylated benzene derivatives such as benzene, halobenzenes such as chlorobenzene, bromobenzene, etc. or nitrobenzenes, etc. will usually react less substantially than the corresponding alkylated or hydroxylated derivatives and will yield a difficulty separable mixtures of polyhydroxy aromatic compounds and other derivatives thereof.

The reaction of the present invention is effected in the presence of certain catalytic compositions of metal, these compounds comprising heterogenous catalysts of supported or unsupported metals which are in a valence state of zero. Some specific metals which may be used to catalyze the hydroxylation reaction will include titanium, vanadium, chromium, manganese, iron, cobalt, nickel, copper, zinc, gallium, germanium, zirconium, niobium, molybdenum, ruthenium, rhodium, palladium, silver, cadmium, indium, tin, antimony, tantalum, tungsten, rherium, osmium, iridium, platinum, gold, mercury, thallium, lead, etc. Of of aforementioned metals the preferred catalysts comprise iron, nickel, copper or chromium due to their relatively greater availability and correspondingly lower cost. These metals, as hereinbefore set forth, are utilized in a valence state of zero, being elemental in nature and may be used in an unsupported state or may be supported on a solid support such as a metal oxide including alumina, silica, zirconia or mixtures thereof such as alumina-silica, alumina-silica-zirconia, etc. In addition, it is also contemplated that alloys and mixtures of metals in the valent state of zero such as various steels which contain iron, chromium, nickel, cobalt, molybdenum, manganese, etc. all in a valence state of zero, mixtures of aluminum, nickel, and cobalt, etc. may also be used as catalysts or the reaction of the present invention.

The process of this invention is effected by treating an aromatic compound of the type hereinbefore set forth in greater detail with hydrogen peroxide in the presence of the catalyst comprising the metal in a valence state of zero. The hydrogen peroxide which is utilized as the hydroxylation agent may be present in an aqueous solution containing from about 5% up to about 90% or more hydrogen peroxide. The preferred hydrogen peroxide solution will contain from about 30% to about 50% or higher concentrations of hydrogen peroxide. The hydroxylation conditions under which the present process of treating an aromatic compound with hydrogen peroxide is effected will include temperatures ranging from about −10° up to about 100° C. or more, the preferred temperatures being those in a range of from ambient (about 25° C.) to about 75° C. In addition, the reaction pressure which is utilized will preferably be atmospheric in nature, although it is also contemplated that somewhat higher pressures up to about 50 atmospheres or more may be used, the pressure being that which is necessary to maintain a substantial portion of the reactants in the liquid phase. When superatmospheric pressures are to be utilized in the reaction, the necessary pressures will be provided for by the introduction of a substantially inert gas such as nitrogen into the reaction zone.

The amount of aromatic compound which is treated with the hydrogen peroxide in the presence of a metal derivative of a phthalocyanine will determine whether a mono-hydroxylated aromatic compound or a polyhydroxylated compound will be obtained. For example, if a mono-hydroxylated aromatic compound is desired, an excess of this reactant; namely, the aromatic compound, will be used. Conversely speaking, if a polyhydroxylated aromatic compound is to be the desired product, the relative amount of hydrogen peroxide which is used to treat the aromatic compound will be increased. Generally speaking, the aromatic compound will be in a mole ratio in a range of from about 3:1 to about 15:1 moles of aromatic compound per mole of hydrogen peroxide, although greater or lesser amounts of aromatic compound may also be used, the amount which is used depending, as hereinbefore set forth, as to whether the desired product is to be mono-hydroxylated or polyhydroxylated.

The process of the present invention which comprises the preparation of a hydroxylated aromatic compound may be effected in either a continuous or batch type operation. For example, when a batch type operation is used, a quantity of the aromatic compound is placed in an appropriate apparatus such as a flask which is provided with cooling or heating means, stirring means, etc. or an autoclave, along with the catalyst comprising a metal in a valence state of zero. The hydrogen peroxide is added thereto over a relatively long period of time, the addition usually being accomplished by adding the hydrogen peroxide dropwise while maintaining the apparatus at the proper operating conditions of temperature and pressure. Upon completion of the addition of the hydrogen peroxide reactant, the reaction is allowed to proceed for a predetermined residence time, said residence time varying from about 0.5 up to about 5 hours or more in duration. Upon completion of the desired residence time, the reaction product is recovered, separated from the catalyst, which is in solid form, and subjected to conventional means for purification and recovery, said means including washing the product with an inert organic solvent, flashing off the solvent and subjecting the reaction product to fractional distillation in order to recover the desired hydroxylated aromatic compound.

It is also contemplated within the scope of this invention that the process for obtaining a hydroxylated aromatic compound may be effected in a continuous manner of operation. When such a type of operation is used, the aromatic compound which is to undergo hydroxylation is continuously charged to a reaction zone which is maintained at the proper operating conditions of temperature and pressure, said reaction zone also containing the catalyst comprising a metal in a valence state of zero. In addition, the hydrogen peroxide in the form of an aqueout solution containing from 5% up to about 90% or more hydrogen peroxide is continuously charged to the reaction zone in a slow and deliberate manner. The reaction is allowed to proceed for a predetermined residence time, following which the reactor effluent is continuously withdrawn. The reaction product is separated from the unreacted aromatic compound by conventional means and recovered, the unreacted aromatic compound then being recycled to form a portion of the feed stock. Inasmuch as the catalyst comprising a metal in the valence state of zero is in solid form a particularly preferred method of effecting the continuous type operation is to position the catalyst as a fixed bed in the reaction zone and pass the reactants comprising the aromatic compound and the hydrogen peroxide through the catalyst in either an upward or downward flow. Alternatively speaking, the reaction may also be effected in a moving bed type of operation in which the catalyst and the reactants pass through the reaction zone either concurrently or countercurrently to each other.

Examples of hydroxylated aromatic compounds which may be prepared according to the process of this invention include o-hydroxytoluene (o-cresol), p-hydroxytoluene (p-cresol), 2-hydroxy-p-xylene, 4-hydroxy-o-xylene, 2-hydroxyethylbenzene (o-ethylphenol), 2,4-dihydroxyethylbenzene, 2-hydroxy - p - cymene, 2-hydroxy-1-methylnaphthalene, 2,4 - dihydroxy-1-methylnaphthalene, 1-hydroxy-2-methylnaphthalene, 1,4-dihydroxy-2-methylnaphthalene, 2-hydroxy - 1 - methlanthracene, 2,4-dihydroxy - 1 - methylanthracene, catechol, hydroquinone, resorcinol, hydroxyhydroquinone, pyrogallol, guaiacol, 2 - hydroxyphenetol, 2,4 - dihydroxyanisole, 2,4-dihydroxyphenetol, 2-hydroxy-p-methylanisole, 2-hydroxy - p - ethylanisole, 2-hydroxy-o-chlorotoluene, 2-hydroxy - o - bromotoluene, 4-hydroxy - o - chlorotoluene, 4-hydroxy - o - bromotoluene, 5-hydroxy-o-chlorotoluene, 5-hydroxy-o-bromotoluene, 1,1 - di-(p-hydroxyphenyl)-1- desoxy-D-glucitol, 1,1-di-(p-hydroxyphenyl)-1-desoxy-D-mannitol, etc. It is to be understood that the aforementioned compounds are only representative of the class of hydroxylated aromatic compounds which may be prepared and that the present invention is not necessarily limited thereto.

The following examples are given to illustrate the process of the present invention which, however, are not intended to limit the generally broad scope of the present invention in strict accordance therewith.

EXAMPLE I

In this example a mixture of 282 grams (3.0 mole) of phenol and 34.0 grams (0.30 mole) of 30% hydrogen peroxide were recycled through an apparatus containing a hydroxylation catalyst comprising iron in a valent state of zero, said reaction being effected at ambient temperature for a period of 16 hours at the end of this time the reaction product was recovered and subjected to analysis. There was obtained a 43% yield of theoretical based on hydrogen charged and 45% based on hydrogen peroxide consumed, the product comprising polyhydroxylated benzenes. The polyhydroxylated benzenes comprised a mixture of catechol and hydroquinone, the ratio of hydroquinone to catechol being 0.62:1.

EXAMPLE II

In this example 40 cc. (0.4 mole) of a 30% hydrogen peroxide solution was slowly added dropwise over a period of 5 hours to a vigorously stirred slurry of 376 grams (4.0 moles) of phenol and 20 grams of a steel powder, the reaction mixture being maintained in the range of from 54° to 61° C. At the end of the 5 hour period the solution was allowed to return to room temperature and the stirring was discontinued. The supernatant liquid was recovered and analyzed by means of a Gas-Liquid Chromatograph. This analysis indicated the presence of catechol and hydroquinone in a 31% yield based on the amount of hydrogen peroxide charged to the reaction. In addition, it was also determined that the ratio of hydroquinone to catechol was 0.57:1.

EXAMPLE III

A solution of 11.3 grams (0.1 mole) of a 30% aqueous hydrogen peroxide solution is mixed with 92 grams (1.0 mole) of toluene and the resulting suspension is placed in a condensation apparatus along with 2 grams of finely-divided elemental nickel. The mixture is stirred for a period of 16 hours while maintaining the reactor at a temperature of about 30° C. At the end of this time the reaction mixture is recovered, separated from the catalyst and subjected to analysis by means of a Gas-Liquid Chromatograph. This analysis will disclose the presence of a mixture of cresols along with unreacted toluene and unconsumed hydrogen peroxide.

EXAMPLE IV

In this example 1 mole of anisole and 0.1 mole of a 30% aqueous hydrogen peroxide solution is placed in a reaction vessel along with 2 grams of powdered elemental chromium. The mixture is heated to a temperature of about 40° C. and maintained thereat for a period of about 20 hours, the mixture being continuously agitated during the reaction period. At the end of this time heating is discontinued and the reaction mixture, after cooling to room temperature, is separated from the catalyst. The analysis of the reaction mixture will disclose the presence of a mixture of o-methoxyphenol and p-methoxyphenol along with unreacted anisole and unconsumed hydrogen peroxide.

EXAMPLE V

A mixture of 0.1 mole of 30% aqueous hydrogen peroxide and 1.0 mole of m-xylene is placed in a reaction vessel along with 2 grams of finely-divided elemental iron. The slurry is thereafter treated in a manner similar to that herein set forth in the preceding examples. Upon completion of a residence time of 20 hours in the reactor, the reaction mixture is recovered and subjected to a Gas-Liquid Chromatographic analysis. The results of this analysis will disclose the presence of 2,4-xylenol and 2,6-xylenol.

EXAMPLE VI

In this experiment 1.0 mole of ethylbenzene is placed in a reaction vessel along with 2 grams of powdered elemental nickel. To this feed stock is added 0.2 mole of a 50% hydrogen peroxide solution, the addition of the hydrogen peroxide being effected dropwise during a period of 0.5 hour. Upon completion of the addition of hydrogen peroxide the stirring of the mixture is continued for a period of 19.5 hours while the temperature of the mixture is maintained at 30° C. At the end of the residence time the reaction product is recovered and subjected to analysis disclosing the presence of a mixture of ethylphenol, ethylcatechol, and ethylhydroquinone along with unrecated ethylbenzene and unconsumed hydrogen peroxide.

We claim as our invention:

1. A process for the nuclear hydroxylation of an aromatic compound having the formula:

in which Ar is a monocyclic or polycyclic aromatic hydrocarbon nucleus, R is independently selected from the group consisting of n-alkyl, sec-alkyl, tert-alkyl, cycloalkyl, hydroxyl, alkoxyl and hydroxyalkyl radicals, X is independently selected from the group consisting of hydrogen, halogen and nitro substituents, $m$ and $n$ are integers of at least one, which process comprises treating said aromatic compound with an aqueous hydrogen peroxide solution containing from about 5% to about 90% hydrogen peroxide, at a temperature in the range of from about $-10°$ to about 100° C. and a pressure in the range of from atmospheric to about 50 atmospheres, in the presence of a catalyst consisting essentially of a metal in the valence state of zero selected from the group consisting of titanium, vanadium, chromium, manganese, iron, cobalt, nickel, copper, zinc, gallium, germanium, zirconium, niobium, mlybendum, ruthenium, rhodium, palladium, silver, cadmium, indium, tin, antimony, tantalum, tungsten, rhenium, asmium, iridium, platinum, gold, mercury, thallium, lead, and mixtures of the foregoing metals, and recovering the resultant hydroxylated aromatic compound.

2. The process of claim 1 in which said catalyst is selected from the group consisting of iron, nickel, copper and chromium.

3. The process as set forth in claim 1 in which said catalyst is iron.

4. The process as set forth in claim 1 in which said catalyst is nickel.

5. The process as set forth in claim 1 in which said catalyst is steel.

6. The process as set forth in claim 1 in which said aromatic compound is phenol and said resultant hydroxylated aromatic compounds are a mixture of catechol and hydroquinone.

7. The process as set forth in claim 1 in which said aromatic compound is toluene and said resultant hydroxylated aromatic compounds are a mixture of cresols.

8. The process as set forth in claim 1 in which said aromatic compound is anisole and said resultant hydroxylated aromatic compounds are a mixture of o-methoxyphenol and p-methoxyphenol.

9. The process as set forth in claim 1 in which said aromatic compound is m-xylene and said resultant hydroxylated romatic compounds are a mixture of 2,4-xylenol and 2,6-xylenol.

10. The process as set forth in claim 1 in which said aromatic compound is ethylbenzene and said resultant hydroxylated aromatic compounds are a mixture of ethylphenol, ethylcatechol, and ethylhydroquinone.

References Cited

UNITED STATES PATENTS

| 2,395,638 | 2/1946 | Milas | 260—621 G |
| 2,437,648 | 3/1948 | Milas | 260—621 G |
| 3,377,386 | 4/1968 | Chavetz | 260—621 G |
| 3,453,332 | 7/1969 | Vesely et al. | 260—613 R |
| 3,461,170 | 8/1969 | Schmerling | 260—613 R |
| 3,531,519 | 9/1970 | Parkin et al. | 260—621 G |

FOREIGN PATENTS

| 1,501,092 | 10/1967 | France | 260—621 G |

BERNARD HELFIN, Primary Examiner

U.S. Cl. X.R.

260—613 R, 621 G, 619 D, 619 R, 619 F, 622 R, 623 R, 624 R, 620, 625